(12) United States Patent
Kim et al.

(10) Patent No.: US 7,020,887 B2
(45) Date of Patent: Mar. 28, 2006

(54) DISC CARTRIDGE AND DISC DRIVE APPARATUS

(75) Inventors: Sun-mo Kim, Daejeon Metropolitan (KR); Han-kook Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 255 days.

(21) Appl. No.: 09/986,982

(22) Filed: Nov. 13, 2001

(65) Prior Publication Data

US 2002/0172127 A1 Nov. 21, 2002

(30) Foreign Application Priority Data

May 16, 2001 (KR) .............................. 2001-26784

(51) Int. Cl.
*G11B 23/03* (2006.01)

(52) U.S. Cl. ..................................................... 720/729
(58) Field of Classification Search ............... 369/77.2, 369/272, 133, 291, 53.2; 360/133, 132, 60, 360/69; 720/626, 645, 656, 729
See application file for complete search history.

(56) References Cited

U.S. PATENT DOCUMENTS

| | | | |
|---|---|---|---|
| 4,995,029 A * | 2/1991 | Kobayashi et al. ......... | 369/291 |
| 5,016,123 A * | 5/1991 | Karsh ........................... | 360/69 |
| 5,091,815 A | 2/1992 | Suzuki | |
| 5,091,901 A * | 2/1992 | Yamamoto et al. ......... | 369/291 |
| 5,173,816 A | 12/1992 | Ogihara | |
| 5,548,571 A * | 8/1996 | Mistretta .................... | 369/77.2 |
| 5,677,898 A * | 10/1997 | Hasegawa et al. ........ | 369/30.66 |
| 5,940,255 A * | 8/1999 | Uwabo et al. .............. | 360/133 |
| 5,982,734 A * | 11/1999 | Yamashita et al. ....... | 369/30.77 |
| 6,052,359 A | 4/2000 | Fujiura | |
| 6,426,849 B1 * | 7/2002 | Osaka ........................ | 360/133 |

FOREIGN PATENT DOCUMENTS

| | | |
|---|---|---|
| EP | 0768665 | 4/1997 |
| JP | 07-176092 | 7/1995 |
| JP | 09-282833 | 10/1997 |
| JP | 09-306143 | 11/1997 |
| JP | 10-003775 | 1/1998 |
| JP | 10-199203 | 7/1998 |
| JP | 10-302438 | 11/1998 |
| JP | 11-120733 | 4/1999 |
| JP | 2000-11577 | 1/2000 |
| JP | 2000-036169 | 2/2000 |
| KR | 1999-0087018 | 12/1999 |

* cited by examiner

*Primary Examiner*—Thang V. Tran
(74) *Attorney, Agent, or Firm*—Stein, McEwen & Bui, LLP

(57) ABSTRACT

In a disc cartridge and a disc drive apparatus, a disc cartridge has an identification opening where an identification plate is installed to be capable of sliding. A probing portion is installed at the disc drive apparatus and is turned on or off by interference with the identification opening. Thus, the type of a disc can be identified by the on/off actions, that is, by interference with the identification plate and probing portion.

57 Claims, 8 Drawing Sheets

DISC CARTRIDGE AND DISC DRIVE APPARATUS

CROSS-REFERENCE TO RELATED APPLICATIONS

This application claims the benefit of Korean Application No. 2001-26784, filed May 16, 2001, in the Korean Industrial Property Office, the disclosure of which is incorporated herein by reference.

BACKGROUND OF THE INVENTION

1. Field of the Invention

The present invention relates to a disc cartridge that accommodates an information recording and/or reproduction medium, and more particularly, to a disc cartridge and a disc drive apparatus having an improved identification mechanism to identify types of discs.

2. Description of the Related Art

In general, a disc cartridge is used in a disc drive and accommodates a disc-type recording and/or reproduction medium, such as an optical disc or magnetooptical disc. The disc cartridge is widely used as a recording medium for multimedia such as video and sound as well as for text and images. With the continued development of multimedia, a disc cartridge having a large capacity is required. As such, various types of disc cartridges have been developed that accommodate a disc having an improved recording density. For example, in the case of a DVD-RAM, there are various types of discs such as a general single-sided type disc (where information is recorded on only one side thereof), a double-sided type disc (where information is recorded on both sides thereof, a single-sided, double-layer type disc (where two recording layers are formed on one side thereof), and a disc where a track pitch is relatively narrow as compared to the general single-sided type disc. Thus, a variety of type of disc cartridges which can accommodate the above discs having various types of recording density are provided.

However, when the recording density varies, a recording and/or reproduction method performed by a disc drive apparatus varies accordingly. That is, the disc drive apparatus performs a method of recording or reproducing information according to the structure of a track pitch of a disc or according to the type of a layer of a disc, such as a single layer or double layer. Thus, the disc drive apparatus needs a mechanism to detect the type of the disc when the disc cartridge accommodating the disc is inserted into the disc drive apparatus.

FIG. 1 shows a conventional mechanism to detect the type of a disc, an example of which is disclosed in Japanese Patent Publication No. 11-120733. Referring to FIG. 1, a magnet 5, which is used to identify a large capacity disc, is installed at a disc cartridge 1. The disc cartridge 1 rotatably accommodates a disc 2 in a case 3. A magnetic sensor 7, which detects the magnet 5, is installed at a disc drive apparatus 6. Thus, when the disc cartridge 1 is inserted in the disc drive apparatus 6, the magnetic sensor 7 detects a magnetic force of the magnet 5 to determine that the disc 2 in the disc cartridge 1 has a large capacity. Then, the detected result is transmitted to a controller (not shown) of the disc drive apparatus 6 so that the controller can control the recording and/or reproduction according to the type of the disc 2.

However, when a disc 2 has a small capacity, the magnet 5 is not installed. Thus, when the disc cartridge 1 accommodating the disc 2 having a small capacity is inserted in the disc drive apparatus 6, the magnetic sensor 7 does not detect a magnetic force. As such, the disc drive apparatus 6 determines that the disc 2 in the disc cartridge 1 is a disc 2 having a small capacity.

In the above conventional apparatus, since the type of the disc 2 is detected by the on/off state of the magnetic sensor 7 according to the presence or absence of the magnet 5, only two types of a disc (i.e., a high capacity or a small capacity) can be detected. Thus, to detect a variety of types of discs 2, the number of the magnets 5 should be increased. Accordingly, the corresponding number of the magnetic sensors 7 are installed so that the type of the disc 2 is detected using the ones of the magnetic sensors 7 that are turned on.

According to another method, by installing the magnets 5 having different magnetic forces according to the types of discs 5, the type of the disc 5 is detected. In this case, it is necessary to install a circuit that is accurate in detecting different magnetic force intensities instead of just detecting an ON and an OFF state.

According to these conventional apparatuses, increasing the number of the magnetic sensors 7 prevents manufacturing smaller and lighter disc drive apparatuses 6 while increasing the manufacturing cost and lowering productivity. Also, detecting the type of a disc 2 by using different magnetic forces needs an accurate circuit that exacerbates these problems. Further, when the magnetic force deteriorates, there is a possibility that the type of the disc 2 would be incorrectly determined.

Therefore, a disc cartridge and a disc drive apparatus having an improved, but simpler structure to detect the various types of discs is needed.

SUMMARY OF THE INVENTION

To solve the above and other problems, it is an object of the present invention to provide a disc cartridge and a disc drive apparatus which can distinguish a variety of types of discs to determine the type of the disc accommodated in the disc cartridge with a simpler structure.

Additional objects and advantages of the invention will be set forth in part in the description which follows and, in part, will be obvious from the description, or may be learned by practice of the invention.

To achieve the above and objects, a disc cartridge has a disc having information to be recorded and/or reproduced using a disc drive apparatus, the disc cartridge according to an embodiment of the invention including a case to rotatably accommodate the disc, and an identification unit disposed on the case to identify a type of the disc by selectively contacting a predetermined probing portion of the disc drive apparatus to produce a sequence of identifying information.

According to another embodiment of the present invention, a disc drive apparatus includes a recording and/or reproduction unit to recording and/or reproduce information with respect to a disc accommodated in a disc cartridge, and a probing portion to identify a disc by selective interference with an identification plate provided at the cartridge to produce a sequence of identifying information.

According to yet another embodiment of the invention, a disc identification mechanism includes identification openings on a disc cartridge having states to identify a type of the disc, and a probing portion on a disc drive apparatus to identify the type of the disc by selective interference with identification plates disposed in the identification openings.

BRIEF DESCRIPTION OF THE DRAWINGS

The above object and advantages of the present invention will become more apparent and more readily appreciated by describing in detail embodiments thereof with reference to the accompanying drawings in which.

DETAILED DESCRIPTION OF THE EMBODIMENTS

Figure 1:
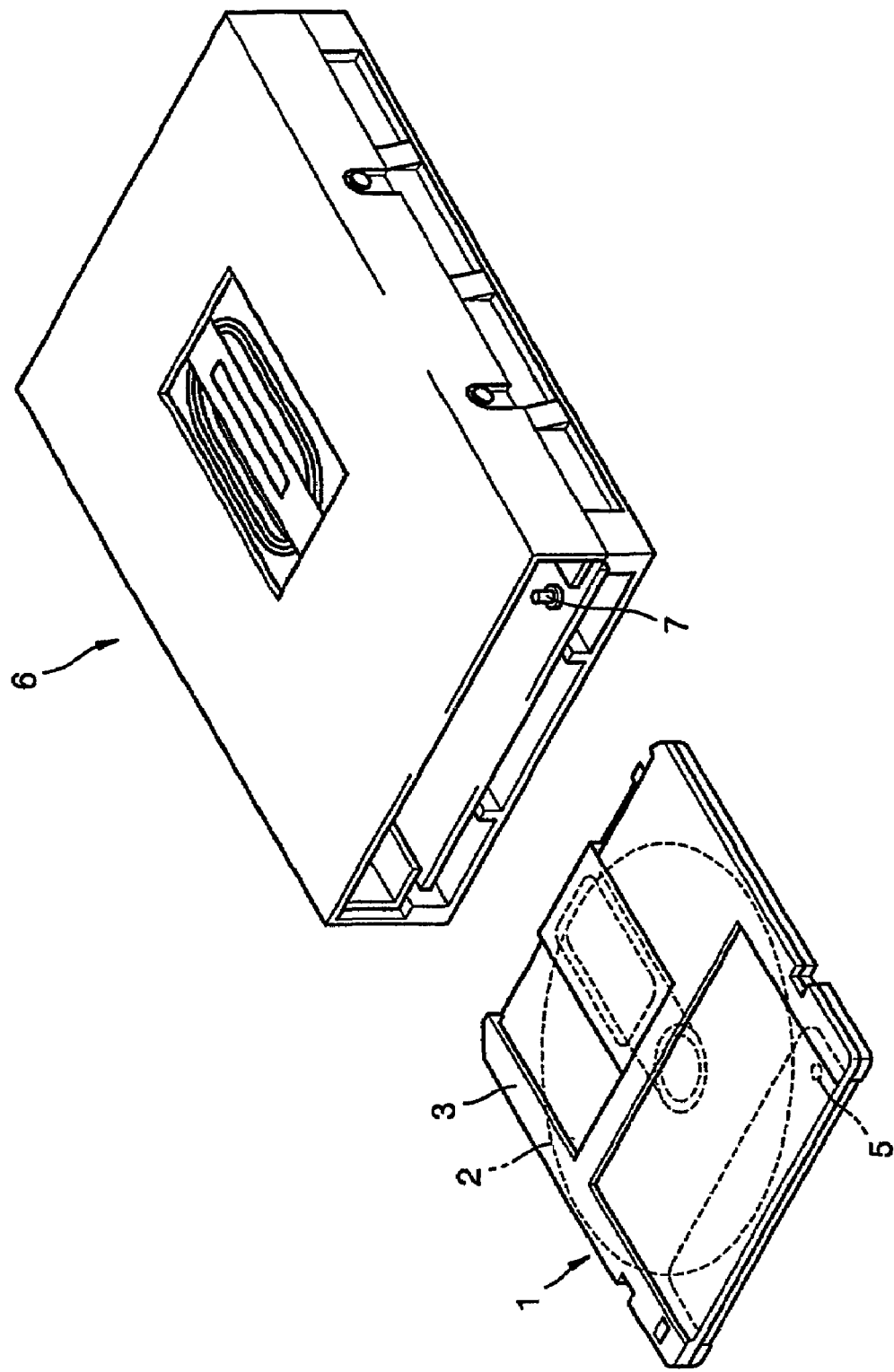
FIG. 1 is a perspective view showing a disc cartridge and disc drive apparatus having the conventional disc identification mechanism.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
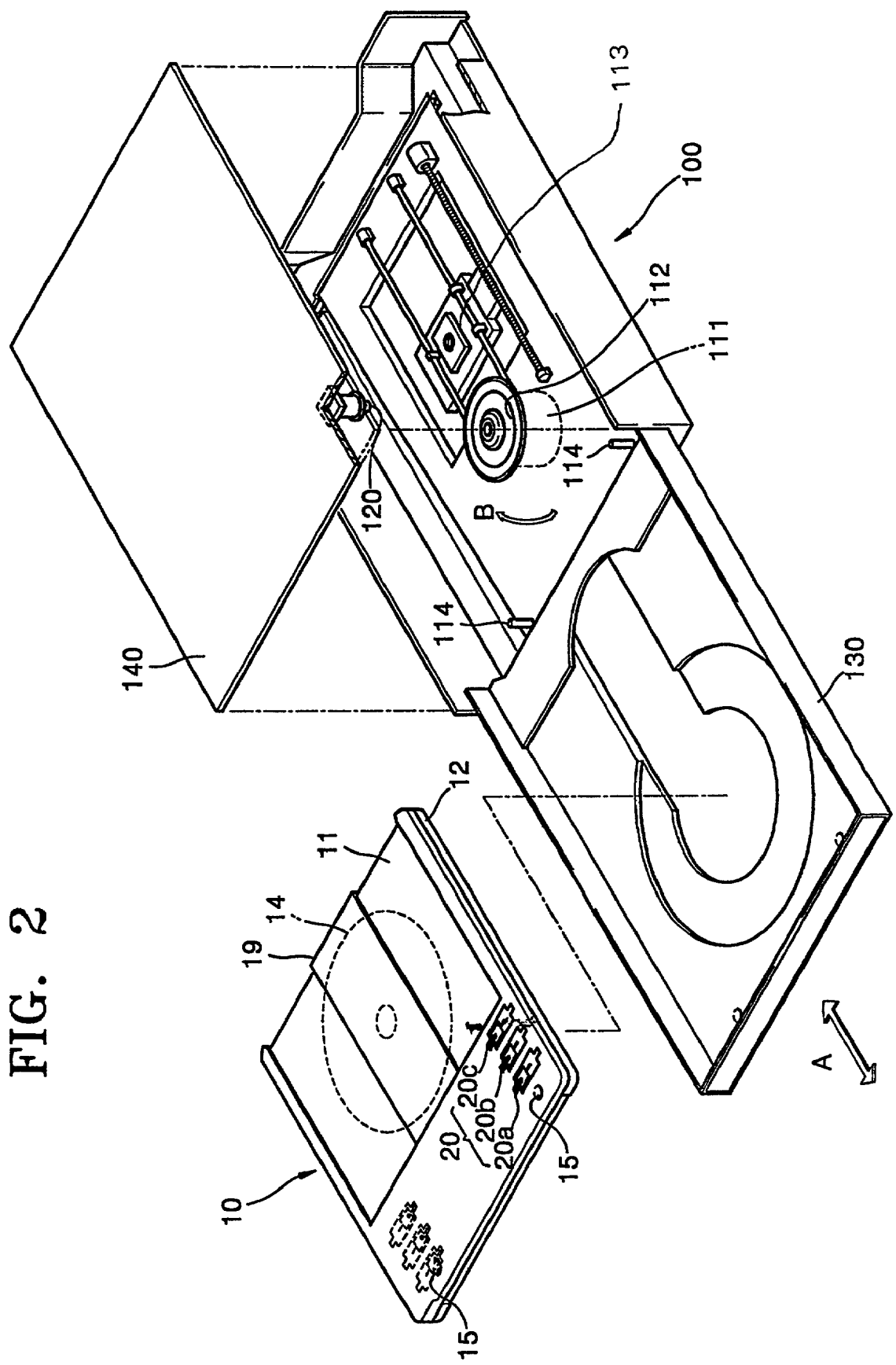
FIG. 2 is a perspective view showing a disc cartridge and a disc drive apparatus having a disc identification mechanism according to an embodiment of the present invention.
Figure 3:
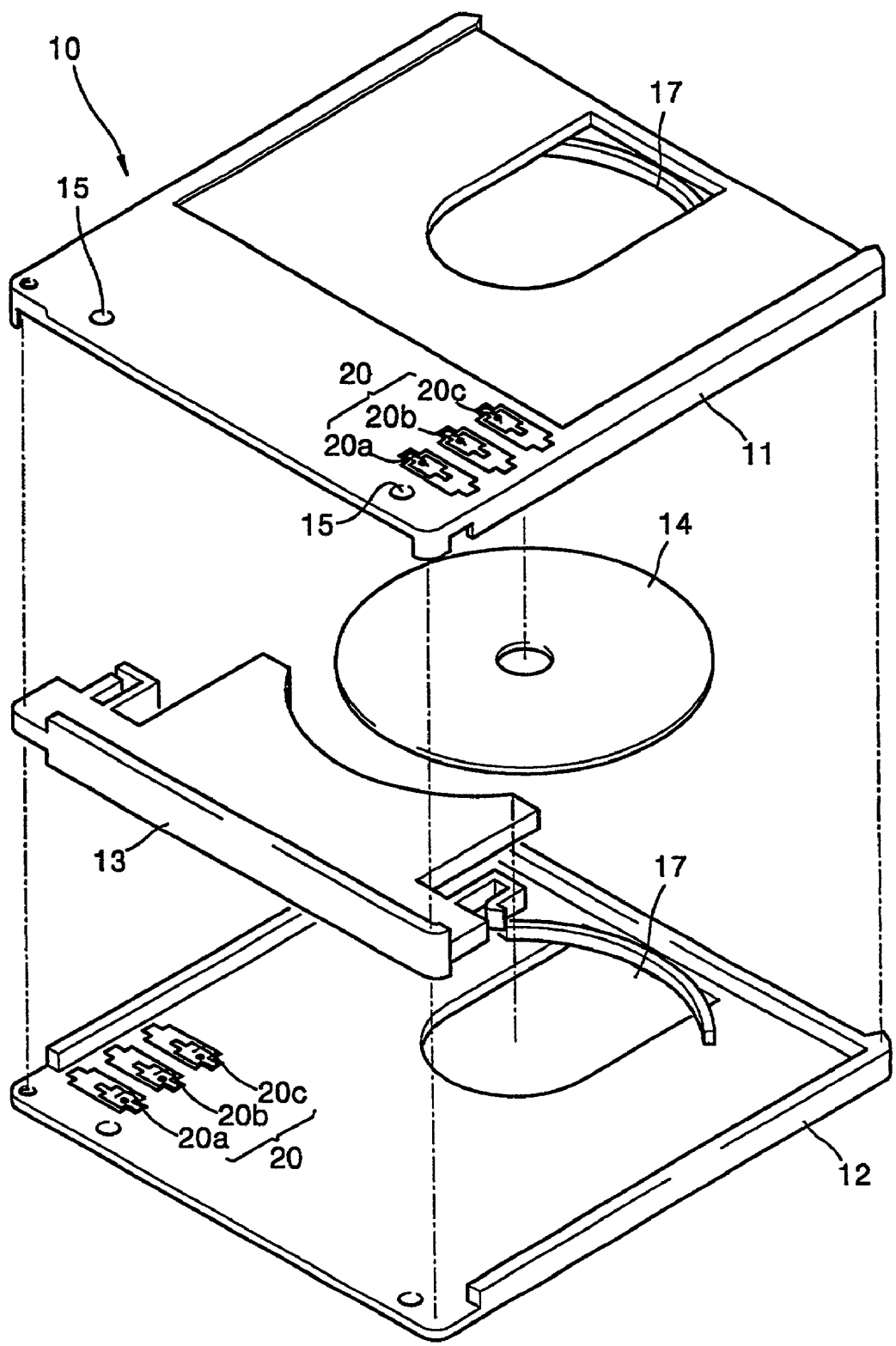
FIG. 3 is an exploded perspective view of the disc cartridge of FIG. 1.
Figure 4:
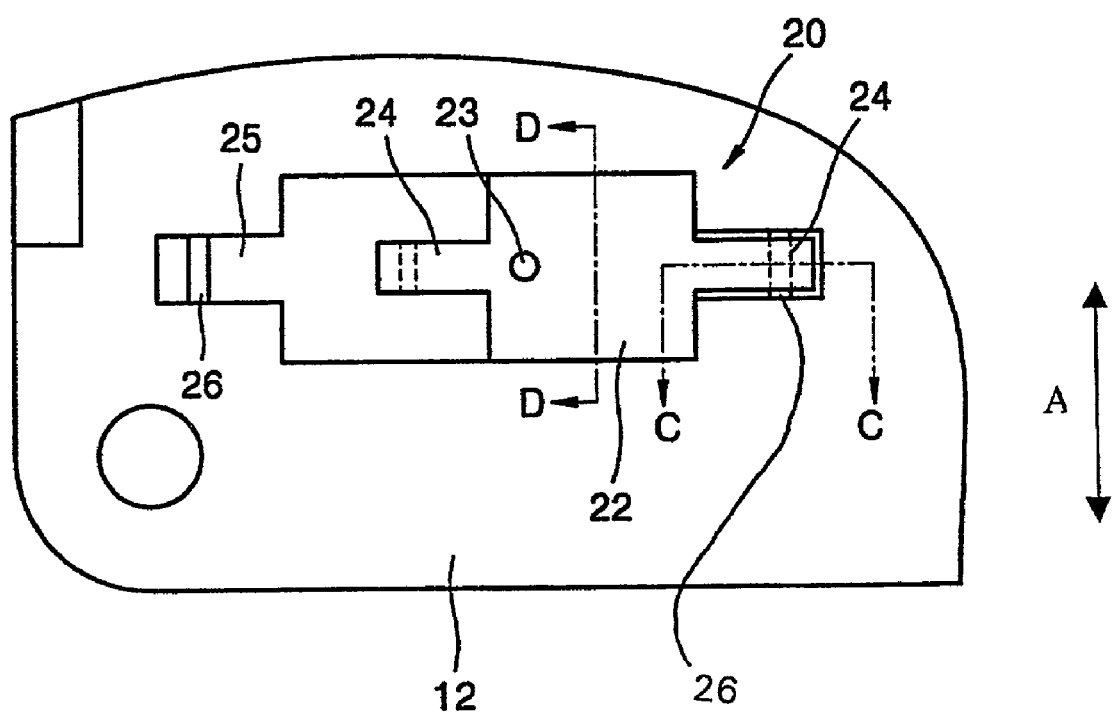
FIG. 4 is a magnified plan view showing the identification hole of FIG. 3.

Referring to FIGS. 2 and 3, a disc cartridge 10 includes an upper case 11 and a lower case 12. A disc 14, which is a information recording and/or reproduction medium, is accommodated between the upper and lower cases 11 and 12. An opening cover 13 is provided so that the disc 14 can be inserted into or removed from the disc cartridge 10. Openings 17, along which an optical pickup device 113 moves in a radial direction of the disc 14 when the disc cartridge 10 is loaded in a disc drive apparatus 100, are installed at the upper case 11 and the lower case 12, respectively. A shutter 19 to prevent intrusion of foreign materials such as dust into the disc cartridge 10 is slidably installed to cover the openings 17.

A plurality of identification openings 20 are formed in each of the upper and lower cases 11 and 12 at a constant interval in-line with a direction in which the disc cartridge 10 is loaded into the disc drive apparatus 100 (i.e., a direction indicated by an arrow A). As such, the identification openings 20 are in-line with a direction of relative movement between the disc cartridge 10 and the disc drive apparatus 100. It is understood that the opening 17, the shutter 19, and the identification openings 20 need only be provided on one of the upper and lower cases 11 and 12 if the disc 14 has only a single recording surface.

Referring to FIGS. 2, 4, 5A and 5B, an identification plate 22 is disposed in each of the identification openings 20. The identification plate 22 has protruding portions 22a formed at both ends of the identification plate 22. The identification plate 22 is capable of sliding in a direction perpendicular to the direction A. An adjustment hole 23 is formed at a central portion of the identification plate 22. Thus, the identification plate 22 can slide to the left and right in FIG. 4. The position thereof can be changed by putting a tip of an object (not shown), such as a ballpoint pen or pencil, into the adjustment hole 23. According to the position of the identification plate 22 in each of the identification openings 20, a probing rod 121 of a probing portion 120 is pressed or is not pressed to turn ON or OFF the probing portion 120 so that the type of the disc 14 can be identified. The above operational mechanism will be described later in greater detail.

Figure 5A:
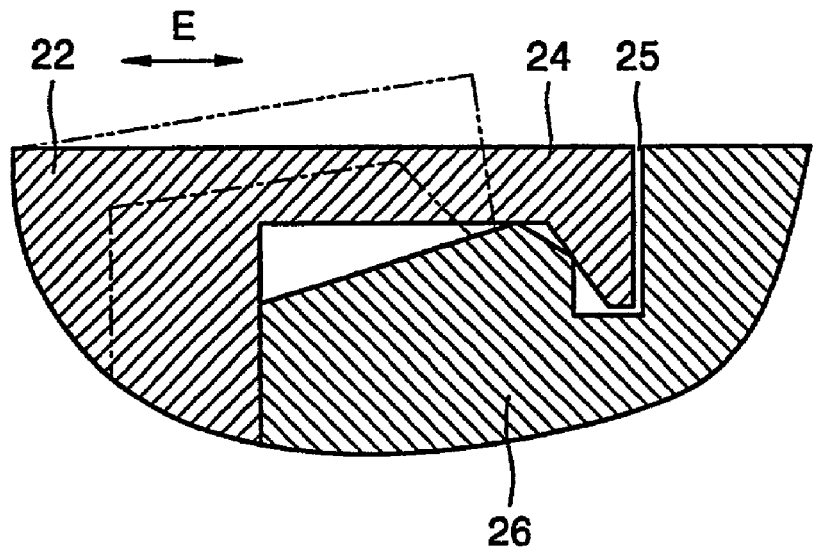
FIG. 5A is a sectional view taken along line C—C of FIG. 4.
Figure 5B:
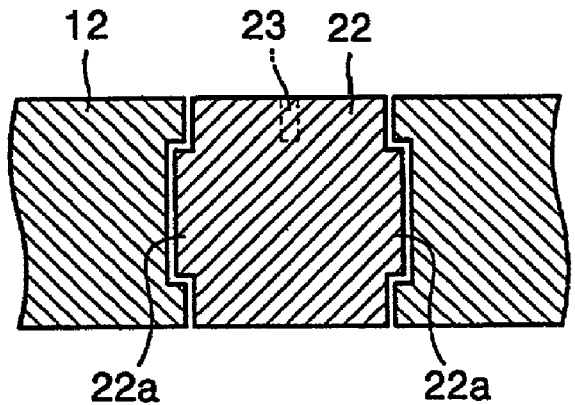
FIG. 5B is a sectional view taken along line D—D of FIG. 4.

A hooking portion 24 extends a predetermined length from the identification plate 22 and is provided at both ends of the identification plate 22 in a direction E shown in FIG. 5A within each of the identification openings 20. A guide groove 25 is formed at both ends of each of the identification openings 20 corresponding to the hooking portion 24. A hooking step 26 protrudes from the bottom surface of the guide groove 25. Thus, as the identification plate 22 slides in the guide groove 25, the hooking portion 24 is hooked by the corresponding hooking step 26 of the guide groove 25 so that the identification plate 22 is fixed at an end of the identifying opening 20. It is understood that the hooking portion 24 can be formed extending into the guide groove 25 to hook a corresponding hooking step 26 disposed on an end of the identification plate 22. It is further understood that other mechanisms are available to selectively fix the identification plate 22 at an end of the identifying opening 22 to provide a state for the identification opening 22.

The hooking portion 24 and the guide groove 25 can be easily formed using injection molding. Since the hooking portion 24 itself has an elastic force, as indicated by a dashed line in FIG. 5A, it can move elastically while being hooked by the hooking step 26. However, it is understood that the hooking portion 24 and guide groove 25 can be formed using other methods and attached using non-elastic mechanisms.

In the embodiment of the present invention shown in FIG. 2, three identification openings 20 are formed. However, the number of the identification openings 20 is not limited thereto and may increase or decrease as the standard of identification of a disc 14 varies.

Each of the identification openings 20 indicates a different feature of a disc. For example, an identification opening 20a indicates a type of the disc 14 as a 12 cm disc or an 8 cm disc. An identification opening 20b indicates whether the disc 14 is a single-sided disc or double-sided disc. An identification opening 20c indicates the state of the disc 14, such as whether the disc 14 is read-only or is recordable, whether the disc 14 is write protected, whether the disc 14 has narrowed tracks, or whether the disc 14 has multiple recording layers per side.

The disc cartridge 10 includes position determination holes 15 into which position determination pins 114 of the disc drive apparatus 100 are inserted to determine and/or position the disc cartridge 10.

Figure 6:
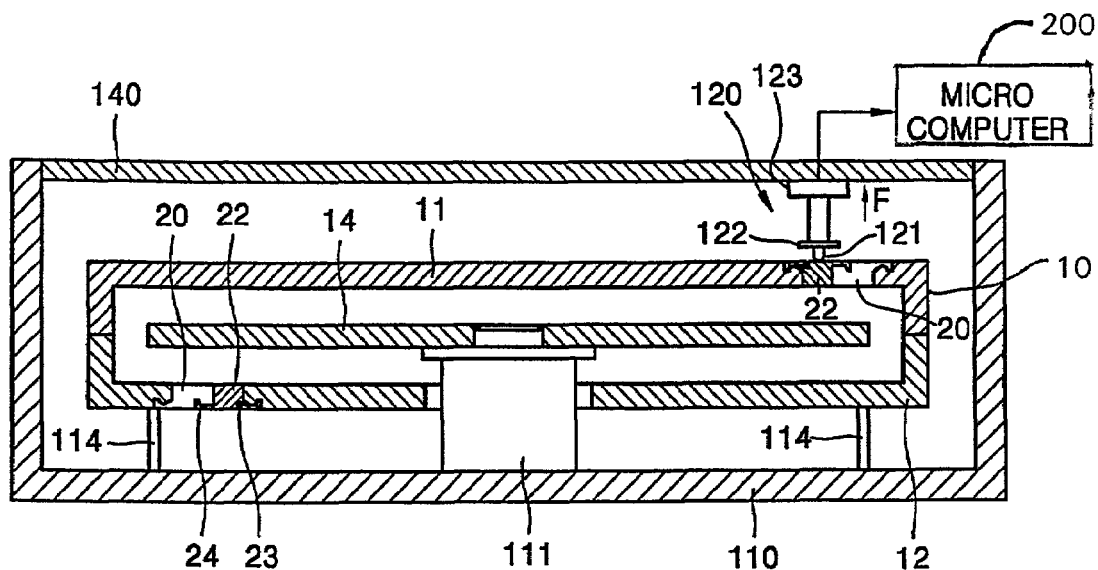
FIG. 6 is a view showing a state in which a probe switch of a probing portion is in an ON state.
Figure 7:
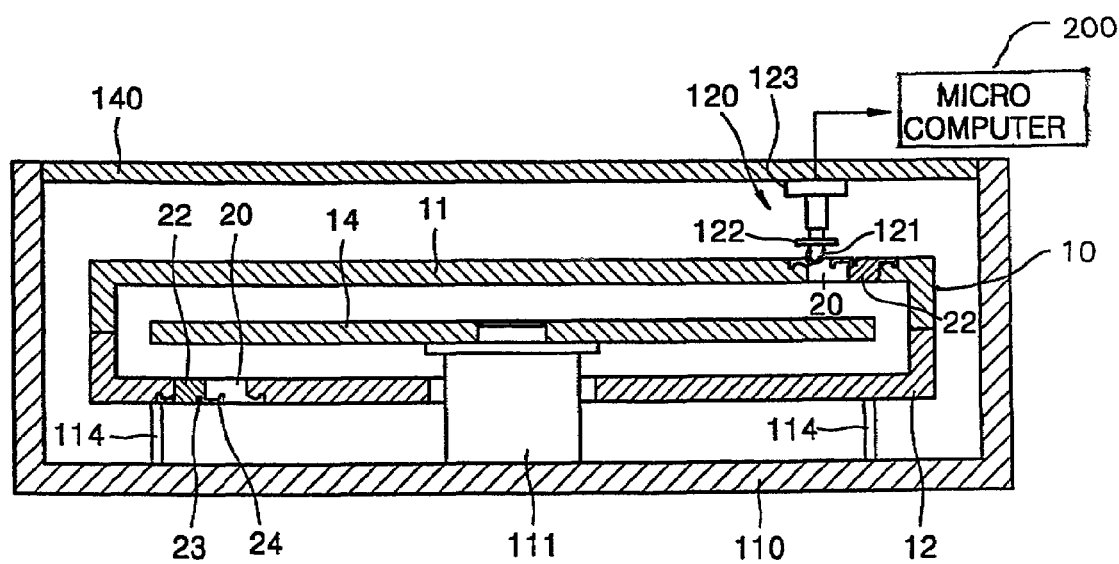
FIG. 7 is a view showing a state in which a probe switch of a probing portion is in an OFF state.

As shown in FIGS. 2, 6 and 7, the disc cartridge 10 is placed on a tray 130 and is loaded into the disc drive apparatus 100. A pivot chassis 110 is installed at the disc drive apparatus 100 which pivots by a predetermined cam mechanism (not shown) up and down in a direction B (see FIG. 2). A recording/reproduction unit includes a turntable 112 onto which the disc 14 is placed, and a spindle motor 111 to drive the turntable 112 to rotate. An optical pickup 113 to record and/or reproduce information with respect to the disc 14 is installed on the pivot chassis 110.

An upper cover 140 is installed at the upper portion of the disc drive apparatus 100. The probing portion 120 is installed at the upper cover 140 opposite the identification openings 20. The probing portion 120 is pressed or not pressed by the identification plates 22 as the disc cartridge 10 moves past the probing portion 120 while being loaded into the disc drive apparatus 100 so that the disc 14 can be identified. As such, the probing portion 120 is selectively activated due to the relative motion of the identification holes 20.

The probing portion 120 includes the probing rod 121, a probing sensor 122, and a probing switch 123. The probing rod 121 is formed to be pressed. When the disc cartridge 10 is loaded into the disc drive apparatus 100, the probing rod 121 is pressed by the identification plate 22 in the direction F, and the probing switch 123 is turned ON by the probing sensor 122. When the probing rod 121 is not pressed, the probing switch 123 is turned OFF. Here, the probing portion 120 is connected to a microcomputer 200 which determines the ON/OFF state of the probing switch 123 as part of an identifying sequence to identify the type of the disc 14. The probing portion 120 is not limited to the above shown in the drawing and a various modifications thereof having the same function are possible. For instance, it is understood that the probing portion 120 could be an optical or magnetic switch that sequentially reads reflected light or detects magnets to obtain the identifying sequence. Further, it is understood that the probing portion 120 could be disposed on a movable track (not shown) to move past the disc cartridge 10.

The pivot chassis 110 ascends when the tray 30 is loaded and descends when the tray 30 is unloaded. When the tray 130 is loaded, the disc 14 in the disc cartridge 10 is placed on the turntable 112 and the position determination pins 114 are inserted in the position determination holes 15.

The method of identifying the type of the disc 14 accommodated in the disc cartridge 10 loaded in the disc drive apparatus 100 having the above structure is described as follows. It is understood that the microcomputer 200 can identify the sequence of signals using software encoded on a computer readable medium.

FIG. 6 shows the probing switch 123 of the probing portion 120 in the ON state, and FIG. 7 shows the probing switch 123 in the OFF state. Referring to FIG. 6, when the disc cartridge 10 is placed on the tray 130 and is loaded into the disc drive apparatus 100, the pivot chassis 110 ascends in the direction B (see FIG. 2) to place the disc 14 on the turntable 112. Here, the probing portion 120 is sequentially disposed above the identification plate 22 of each of the identification openings 20 as the disc cartridge 10 moves in the direction A into the disc drive apparatus 100. Thus, when the disc cartridge 10 is placed on the tray 130 and is then loaded into the disc drive apparatus 100, the probing rod 121 contacts and slides over ones of the identification plates 22 to be turned ON, and is received into ones of the identification holes 20 to be turned OFF. Specifically, where the identification plate 22 is at an end of the identification opening 20 to be contacted, the probing rod 121 is pressed by the identification plate 22 in a direction F as the probing portion 120 moves relative to the identification opening 20. As the probing rod 121 is pressed, the probing sensor 122 coupled to the probing rod 121 moves in the direction F and contacts the probing switch 123. The probing switch 123 is then in the ON state. A signal indicating the ON state is transmitted to the microcomputer 200 so that a feature of the disc 14 is identified.

In FIG. 7, the probing rod 121 is disposed not to be in contact with the identification plate 22. When the disc cartridge 10 placed on the tray 130 and is loaded into the disc drive apparatus 100 in the A direction, the identification plate 22 is at an end of the identification opening 20 not to be contacted by the probing rod 121. Thus, the probing rod 22 is not pressed when pressing over the identification opening 20 such that the probing sensor 122 does not contact the probing switch 123 and is in the OFF state. A signal indicating the OFF state is transmitted to the microcomputer 200 so that a feature of the disc 14 is identified.

Meanwhile, three identification openings 20a, 20b, 20c are formed in the disc cartridge 10. The identification openings 20a, 20b, 20c turn the probing switch 123 ON/OFF according to the position of the identification plates 22 to generate an identification sequence for features of the disc 14. For example, the identification opening 20a identifies the size of the disc 14 to be 12 cm when the probing rod 121 is pressed by the identification plate 22. When the probing rod 121 is not pressed, the size of the disc 14 is identified to be 8 cm. The identification opening 20b identifies whether the disc 14 is a single-sided disc when the probing rod 121 is pressed by the identification plate 22. When the probing rod 121 is not pressed, the disc 14 is identified to be a double-sided disc. The identification opening 20c identifies the disc 14 to be a read-only disc when the probing rod 121 is pressed by the identification plate 22. When the probing rod 121 is not pressed, the disc 14 is identified to be a read/write disc. Of course, the position of the identification plate 22 is not limited to the above and can be arbitrarily changed. Also, the number of the identification openings 20 may be increased or decreased as needed.

That is, when the disc 14 is an 8 cm, single-sided, and read-only disc, the identification plate 22 of the identification opening 20a is disposed not to contact the probing rod 121, the identification plate 22 of the identification opening 20b is disposed to contact the probing rod 121, and the identification plate 22 of the identification opening 20c is disposed not to contact the probing rod 121. Then, when the disc cartridge 10 is loaded into the disc drive apparatus 100 and moves in the A direction, the probing switch 123 is sequentially turned OFF, ON, and OFF to generate an identification sequence so that the microcomputer 200 identifies the type of the disc 14.

In the shown embodiment, assuming that both sides of the disc 14 inserted in the disc cartridge 10 are used, the identification openings 20 are formed at the upper case 11 and the lower case 12. Thus, when the disc cartridge 10 is inserted upside down, the same identification operation is performed by the probing portion 120. However, it is understood that if both sides of the disc 14 are not used, the identification openings 20 need not be on both the upper and lower cases 11 and 12.

Figure 8:
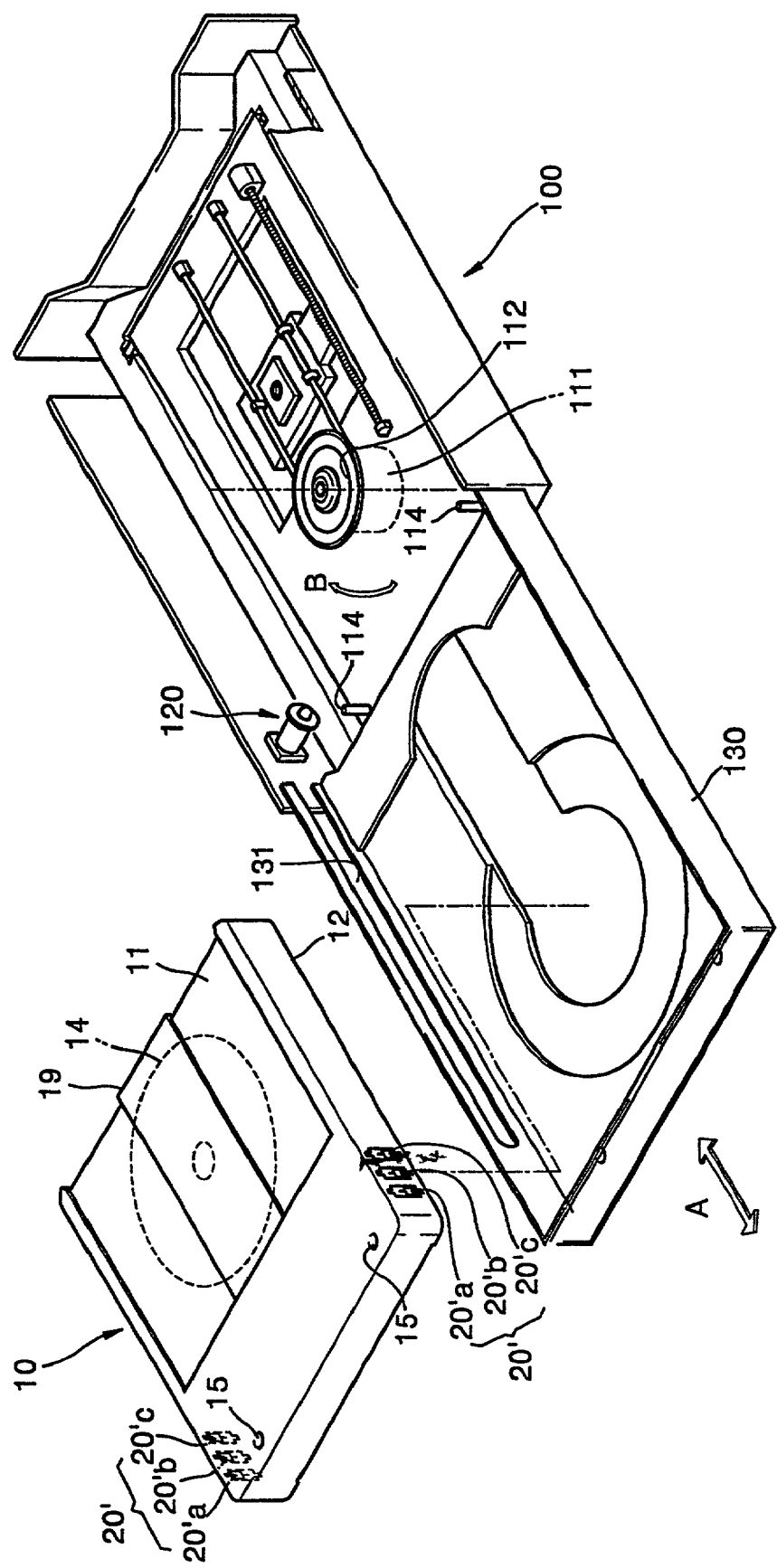
FIG. 8 is a perspective view showing a disc cartridge and a disc drive apparatus according to another embodiment of the present invention.

FIG. 8 shows a disc cartridge 10 and a disc drive apparatus 100 according to another embodiment of the present invention. Here, the same reference numerals indicate the elements having the same functions. The structure of the embodiment shown in FIG. 8 is substantially the same as that of the embodiment shown in FIG. 2. However, the identification openings 20' are formed at the left and right sides of the disc cartridge 10. The probing portion 120 is installed at the side surface of the disc drive apparatus 100 corresponding to the identification openings 20'. A lengthwise guide groove 131 is formed at the tray 130.

When the tray 130 is loaded or unloaded with respect to the disc drive apparatus 100 in the A direction, the probing portion 120 is guided by the guide groove 131. When the disc cartridge 10 placed on the tray 130 and is loaded into the disc drive apparatus 100, the probing rod 121 of the probing portion 120 selectively contacts the identification plates 22 of the identification openings 20'a, 20'b, 20'c and is sequentially pressed or is not pressed thereby so that the probing switch 123 is turned ON or OFF while passing over the identification openings 20'a, 20'b, 20'c.

Figure 9:
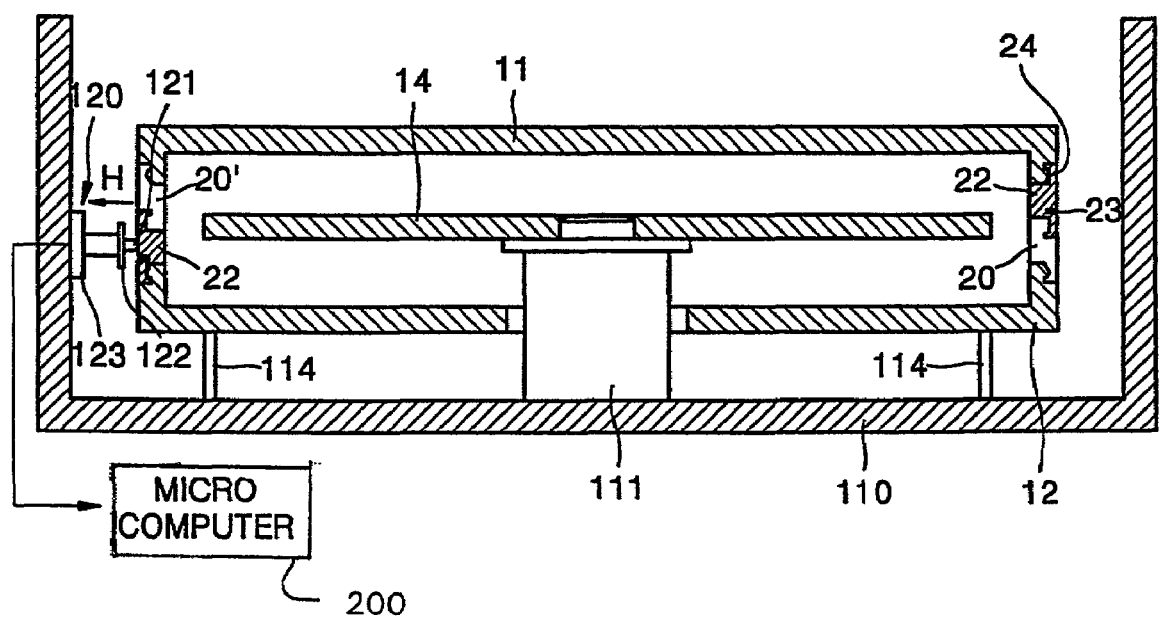
FIG. 9 is a view showing the relation between the disc cartridge and the probing portion.

FIG. 9 shows the relationship between the disc cartridge 10 and the probing portion 120. The probing portion 120 is provided at the side of the disc cartridge 10 having the identification opening 20'. In the shown embodiment, three identification openings 20'a, 20'b, 20'c are provided. When the disc cartridge 10 is loaded into the disc drive apparatus 100, the probing rod 121 is pressed or not pressed by each of the identification openings 20' 20'a, 20'b, 20'c as the disc cartridge 10 is loaded. Thus, the probing switch 123 is turned ON or OFF and the type of the disc 14 is identified by the microcomputer 200 according to this sequence. While not shown, it is understood that individual probing portions 120 could be simultaneously placed in the locations shown in FIGS. 2 and 8.

As described above, in the disc cartridge and disc drive apparatus according to the present invention, since the identification openings and the selective presence of the identification plate can be identified by a single probing portion installed in the disc drive apparatus to determine various types of discs, it is economical and productivity improves. Also, when an additional identification function with respect to the disc is to be added, additional identification openings are added to the disc cartridge such that no additional probing portions are required to detect the additional identification function. However, it is understood that additional locations for the identification holes and probing portions are possible, and that it would be possible to use additional probing portions in different locations and different identification sequences according to the present invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A disc cartridge having a disc where information is recorded and/or reproduced using a disc drive with a probing portion, comprising
    a case to rotatably accommodate the disc; and
    an identification unit disposed on said case to identify a type of the disc using the probing portion of the disc drive,
    wherein the probing portion is selectively pressed by said identification unit to produce a sequence of information to determine the type of the disc, the sequence of information being produced as elements of the sequence are sequentially detected by the probing portion as the case moves past the probing portion.

2. A disc cartridge having a disc where information is recorded and/or reproduced using a disc drive with a probing portion, comprising
    a case to rotatably accommodate the disc; and
    an identification unit disposed on said case to identify a type of the disc using the probing portion of the disc drive,
    wherein:
        the probing portion selectively detects said identification unit to produce a predetermined sequence of information to determine the type of the disc, and
        said identification unit comprises:
            an identification opening; and
            an identification plate slideably installed in the identification opening.

3. The disc cartridge as claimed in claim 2, wherein:
    the identification opening comprises guide grooves having corresponding hooking steps formed at corresponding ends of the identification opening, and
    the identification plate comprises hooking portions, wherein each of the hooking portions hooks one of the hooking steps to fix the identification plate at one of the ends of the identification opening.

4. The disc cartridge as claimed in claim 2, wherein the identification plate further includes an adjustment hole at the center of the identification plate, wherein the identification plate slides by inserting a sharpened tip into the adjustment hole.

5. The disc cartridge as claimed in claim 2, wherein said identification unit further comprises additional identification openings having additional corresponding identification plates.

6. The disc cartridge as claimed in claim 2, wherein
    said case comprises an upper case and a lower case,
    said identification unit further comprises an additional identification opening and corresponding additional identification plate, and
    each of the upper case and the lower case includes one of the identification openings and corresponding identification plates.

7. The disc cartridge as claimed in claim 3, wherein
    said case comprises an upper case and a lower case,
    said identification unit further comprises an additional identification opening and corresponding additional identification plate, and
    each of the upper case and the lower case includes one of the identification openings and corresponding identification plates.

8. The disc cartridge as claimed in claim 4, wherein
    said case comprises an upper case and a lower case,
    said identification unit further comprises an additional identification opening and corresponding additional identification plate, and
    each of the upper case and the lower case includes one of the identification openings and corresponding identification plates.

9. The disc cartridge as claimed in claim 5, wherein
    said case comprises an upper case and a lower case,
    said identification unit further comprises an additional identification opening and corresponding additional identification plate, and
    each of the upper case and the lower case includes one of the identification openings and corresponding identification plates.

10. The disc cartridge as claimed in claim 2, wherein
    said case comprises a top surface parallel with an information recording surface of the disc and a side surface adjacent the top surface, and
    the identification opening is provided at the side surface of said case.

11. The disc cartridge as claimed in claim 3, wherein
    said case comprises a top surface parallel with an information recording surface of the disc and a side surface adjacent the top surface, and
    the identification opening is provided at the side surface of said case.

12. The disc cartridge as claimed in claim 4, wherein
said case comprises a top surface parallel with an information recording surface of the disc and a side surface adjacent the top surface, and
the identification opening is provided at the side surface of said case.

13. The disc cartridge as claimed in claim 5, wherein
said case comprises a top surface parallel with an information recording surface of the disc and a side surface adjacent the top surface, and
the identification opening is provided at the side surface of said case.

14. A disc drive apparatus to drive a disc rotatably accommodated in a disc cartridge having identification plates, comprising:
a recording/reproduction unit to record and/or reproduce information with respect to the disc rotatably accommodated in the disc cartridge; and
a probing portion to selectively detect the identification plates provided at the disc cartridge to produce a sequence of information to identify a type of the disc.

15. The disc drive apparatus as claimed in claim 14, wherein said probing portion comprises:
a probing rod to contact the identification plates,
a probing sensor installed at the probing rod, and
a probing switch which is turned one of ON and OFF due to a movement by the probing sensor.

16. A disc identification mechanism to identify a type of a disc in a disc cartridge using a disc drive to record and/reproduce information on the disc and having a probing portion, the mechanism comprising:
identification openings installed at the disc cartridge, each said identification opening having an identification plate slideably attached therein; and
a probing portion installed at the disc drive to identify the type of the disc by detecting positions of the identification plates,
wherein a contact between said probing portion and the identification plates produces a sequence of information to identify the type of the disc.

17. A disc cartridge having an information recording medium and which is received by an apparatus having a probing portion, comprising:
a case having sides defining an inner space to accommodate the information recording medium therein and an opening/closing member which opens and closes an opening through which the information recording medium is accessed, a first one of the sides being disposed above or below and extending across at least a portion of a recording surface of the information recording medium; and
identification units disposed on the first side, each of the identification units being detected by a common element of the probing portion such that the probing portion produces a sequence of information to determine a type of the information recording medium.

18. The disc cartridge of claim 17, wherein the sequence of the information is produced as said identification units move relative to the probing portion such that corresponding elements of the sequence are sequentially detected.

19. The disc cartridge of claim 17, wherein said identification units are disposed on said case in a line such that the probing portion detects said identification units during insertion into the apparatus.

20. The disc cartridge of claim 17, wherein said identification units are detectable by contact with a common tip of the probing portion.

21. A disc cartridge having an information recording medium and which is received by an apparatus having a probing portion, comprising:
a case to accommodate the information recording medium; and
identification units disposed on said case to be sequentially detected by the probing portion of the apparatus to produce a predetermined sequence of information to determine a type of the information recording medium,
wherein:
the sequence of the information is produced by a relative motion between said identification units and the probing portion,
each of said identification units comprises an identification opening having an identification plate disposed therein, and
a position of the identification plate is detected by the probing portion to indicate a feature used to identify the type of the information recording medium.

22. The disc cartridge of claim 21, wherein the identification plates are slideably disposed in the identification openings, and are fixed in the positions to indicate the type of the information recording medium.

23. The disc cartridge of claim 22, wherein each of said identification units further comprises:
a first interlocking piece disposed at one of the identification plate and the identification opening, and
a second interlocking piece to interlock with the first interlocking piece disposed at the other one of the identification plate and the identification opening.

24. The disc cartridge of claim 23, wherein:
the first interlocking piece comprises a hooking portion, and
the second interlocking piece comprises a groove to securely receive the hooking portion.

25. The disc cartridge of claim 24, wherein the hooking portion is disposed on the identification plate, and the groove is in said case.

26. The disc cartridge of claim 17, further comprising a first positioning unit disposed on said case to be received by a second positioning unit disposed on the apparatus to position the disc cartridge in the apparatus.

27. The disc cartridge of claim 19, further comprising a first positioning unit disposed on said case to be received by a second positioning unit disposed on the apparatus to position the disc cartridge after being inserted into the apparatus.

28. The disc cartridge of claim 27, wherein said first positioning unit comprises a positioning hole and the second positioning unit comprises a positioning pin to be received into the positioning hole.

29. A disc cartridge having an information recording medium and which is received by an apparatus having a probing portion, comprising:
a case to accommodate the information recording medium; and
identification units disposed on said case to be sequentially detected by the probing portion of the apparatus to produce a sequence of information to determine a type of the information recording medium,
wherein:
the sequence of the information is produced by a relative motion between said identification units and the probing portion, said case further comprises a top side disposed above or below a recording surface of the information recording medium, and a second side disposed adjacent the top side, and said identification units are disposed on the second side.

30. A disc drive apparatus to record and/or reproduce data with respect to an information recording medium disposed in a disc cartridge having identification units, the apparatus comprising:
a turntable to receive the information recording medium;
a motor to drive said turntable to turn the information recording medium;
an optical pickup to record and/or reproduce data with respect to the information recording medium;
a controller to control said motor and said optical pickup according to a type of the information recording medium; and
a probing portion to be sequentially pressed by the identification units of the disc cartridge to detect information from the identification units, and to provide the detected information to said controller,
wherein said controller determines the type of the information recording medium according to the detected information.

31. The disc drive apparatus of claim 30, wherein the detected information is in a sequence produced by a relative motion between the identification units and said probing portion.

32. The disc drive apparatus of claim 30, wherein the identification units are disposed on the disc cartridge in a line such that said probing portion detects the identification units during insertion into the disc drive apparatus.

33. The disc drive apparatus of claim 30, further comprising a tray to receive the disc cartridge, wherein said probing portion detects the identification units as the identification units pass by said probing portion while said tray moves the disc cartridge.

34. The disc drive apparatus of claim 30, wherein said probing portion comprises a tip, wherein the tip detects the identification units.

35. The disc drive apparatus of claim 31, wherein said probing portion detects a position of an identification plate of each identification unit to indicate a feature used by said controller to identify the type of the information recording medium.

36. A disc drive apparatus to record and/or reproduce data with respect to an information recording medium disposed in a disc cartridge having sides defining an inner space to accommodate the information recording medium therein, an opening/closing member which opens and closes an opening, and having identification units on at least a top one of the sides, the apparatus comprising:
a turntable to receive the information recording medium;
a motor to drive said turntable to turn the information recording medium;
an optical pickup to record and/or reproduce data with respect to the information recording medium;
a controller to control said motor and said optical pickup according to a type of the information recording medium; and
a probing portion to sequentially detect the identification units of the disc cartridge, and to provide the detected information to said controller, wherein:
said controller determines the type of the information recording medium according to the detected information,
the detected information is in a sequence produced by a relative motion between the identification units and said probing portion, and
said probing portion is disposed on the disc drive apparatus to detect the identification units disposed on the top side of the disc cartridge, and the top side is disposed above or below and extends at least partially across a recording surface of the information recording medium.

37. A disc drive apparatus to record and/or reproduce data with respect to an information recording medium disposed in a disc cartridge having identification units, the apparatus comprising:
a turntable to receive the information recording medium;
a motor to drive said turntable to turn the information recording medium;
an optical pickup to record and/or reproduce data with respect to the information recording medium;
a controller to control said motor and said optical pickup according to a type of the information recording medium; and
a probing portion to sequentially detect the identification units of the disc cartridge, and to provide the detected information to said controller,
wherein:
said controller determines the type of the information recording medium according to the detected information,
the detected information is in a sequence produced by a relative motion between the identification units and said probing portion, and
said probing portion is disposed on the disc drive apparatus to detect the identification units disposed on a side of the disc cartridge adjacent to a top side that is disposed above or below a recording surface of the information recording medium.

38. A disc drive apparatus to record and/or reproduce data with respect to an information recording medium disposed in a disc cartridge having identification units, the apparatus comprising:
a turntable to receive the information recording medium;
a motor to drive said turntable to turn the information recording medium;
an optical pickup to record and/or reproduce data with respect to the information recording medium;
a controller to control said motor and said optical pickup according to a type of the information recording medium;
a probing portion to sequentially detect the identification units of the disc cartridge, and to provide the detected information to said controller; and
a tray to receive the disc cartridge, said tray including a guide groove to receive said probing portion,
wherein:
said controller determines the type of the information recording medium according to the detected information,
the detected information is in a sequence produced by a relative motion between the identification units and said probing portion, and said probing portion is guided by the guide groove and detects the identification units as the identification units pass by said probing portion while said tray moves the disc cartridge.

39. The disc drive apparatus of claim 30, wherein said probing portion comprises a probing sensor and a probing tip, where the probing tip detects states of each of the identification units and the probing sensor provides the detected states to said controller as the detected information.

40. A disc drive apparatus to record and/or reproduce data with respect to an information recording medium disposed in a disc cartridge having identification units, the apparatus comprising:
- a turntable to receive the information recording medium;
- a motor to drive said turntable to turn the information recording medium;
- an optical pickup to record and/or reproduce data with respect to the information recording medium;
- a controller to control said motor and said optical pickup according to a type of the information recording medium; and
- a probing portion to sequentially detect the identification units of the disc cartridge, and to provide the detected information to said controller,
wherein:
- said controller determines the type of the information recording medium according to the detected information,
- the probing sensor detects a first state if the probing tip contacts an identification plate of the identification unit, and
- the probing sensor detects a second state if the probing tip detects an identification opening of the identification unit and does not contact the identification plate of the identification unit.

41. A method of detecting a type of an information recording medium disposed within a disc cartridge using a probing portion of an apparatus, comprising:
- passing a first identification unit of the disc cartridge by the probing portion and detecting a first feature of the information recording medium from the first identification unit being pressed using the probing portion;
- passing a second identification unit of the disc cartridge by the probing portion and detecting a second feature of the information recording medium from the second identification unit being pressed using the probing portion; and
- determining a type of the information recording medium based upon the detected first and second features.

42. A method of detecting a type of an information recording medium disposed within a disc cartridge using a probing portion of an apparatus, comprising:
- passing a first identification unit of the disc cartridge by the probing portion and detecting a first feature of the information recording medium from the first identification unit using the probing portion;
- passing a second identification unit of the disc cartridge by the probing portion and detecting a second feature of the information recording medium from the second identification unit using the probing portion; and
- determining a type of the information recording medium based upon the detected first and second features,
wherein:
- said passing and detecting the first feature comprises detecting a position of a first identification plate of the first identification unit, and
- said passing and detecting the second feature comprises detecting a position of a second identification plate of the second identification unit.

43. The method of claim 42, wherein:
the probing portion comprises a probing tip;
said passing and detecting the first feature comprises:
- producing an ON state of the probing portion if the probing tip contacts the first identification plate as the first identification unit passes by the probing portion, and
- producing an OFF state of the probing portion if the probing tip detects an opening adjacent the first identification plate as the first identification unit passes by the probing portion;

said passing and detecting the second feature comprises
- producing an ON state of the probing portion if the probing tip contacts the second identification plate as the second identification unit passes by the probing portion, and
- producing an OFF state of the probing portion if the probing tip detects an opening adjacent the second identification plate as the second identification unit passes by the probing portion; and said determining the type of the information recording medium comprises detecting a sequence of the ON and OFF states of the probing portion as the probing portion passes the first and second identification units, and matching the sequence to one of predetermined sequences corresponding to types of information recording media.

44. A computer readable medium encoded with processing instructions for implementing a method of detecting a type of information recording medium disposed in a disc cartridge performed by a computer, the method comprising:
- receiving a first information signal in response to a first identification unit of the disc cartridge passing by a probing portion of an apparatus and detecting a first feature of the information recording medium from the first identification unit being pressed using the probing portion;
- receiving a second information signal in response to a second identification unit of the disc cartridge passing by the probing portion and detecting a second feature of the information recording medium from the second identification unit being pressed using the probing portion; and
- determining a type of the information recording medium based upon the detected first and second features.

45. A computer readable medium encoded with processing instructions for implementing a method of detecting a type of information recording medium disposed in a disc cartridge performed by a computer, the method comprising:
- receiving a first information signal in response to a first identification unit of the disc cartridge passing by a probing portion of an apparatus and detecting a first feature of the information recording medium from the first identification unit using the probing portion;
- receiving a second information signal in response to a second identification unit of the disc cartridge passing by the probing portion and detecting a second feature of the information recording medium from the second identification unit using the probing portion; and
- determining a type of the information recording medium based upon the detected first and second features,
wherein:
- said receiving the first information signal comprises receiving the first information signal in response to the probing portion detecting a position of a first identification plate of the first identification unit, and said receiving the second information signal comprises receiving the second information signal in response to the probing portion detecting a position of a second identification plate of the second identification unit.

46. The computer readable medium of claim 45, wherein:

the probing portion comprises a probing tip;

said receiving the first information signal comprises:
  receiving an ON state of the probing portion if the probing tip contacts the first identification plate as the first identification unit passes by the probing portion, and
  receiving an OFF state of the probing portion if the probing tip detects an opening adjacent the first identification plate as the first identification unit passes by the probing portion;

said receiving the second information signal comprises
  receiving an ON state of the probing portion if the probing tip contacts the second identification plate as the second identification unit passes by the probing portion, and
  receiving an OFF state of the probing portion if the probing tip detects an opening adjacent the second identification plate as the second identification unit passes by the probing portion; and said determining the type of the information recording medium comprises detecting a sequence of the ON and OFF states of the probing portion as the probing portion passes the first and second identification units, and matching the sequence to one of predetermined sequences corresponding to types of information recording media.

47. The computer readable medium of claim 44, further comprising:

controlling a reading and/or writing operation of a disc drive apparatus in accordance with the determined type of the information recording medium.

48. The computer readable medium of claim 46, further comprising:

controlling a reading and/or writing operation of a disc drive apparatus in accordance with the determined type of the information recording medium.

49. An apparatus to identify a type of information recording medium, comprising:

a probing portion;

a case to accommodate the information recording medium;

identification units disposed on said case to be sequentially detected by said probing portion individually pressing the identification units as each identification unit moves past the probing portion to sequentially detect corresponding individual elements of a sequence of information so as to produce the sequence of information; and a detection unit to determine the type of the information recording medium using the produced sequence of information.

50. The apparatus of claim 49, wherein the sequence of the information is produced by a relative motion between said identification units and said probing portion.

51. The apparatus of claim 49, wherein said identification units are disposed on said case in a line such that said probing portion detects said identification units during insertion into the apparatus.

52. The apparatus of claim 49, wherein said identification units are detectable by a common tip of said probing portion.

53. An apparatus to identify a type of information recording medium, comprising:

a probing portion;

a case to accommodate the information recording medium;

identification units disposed on said case to be sequentially detected by said probing portion to produce a predetermined sequence of information; and a detection unit to determine the type of the information recording medium using the predetermined sequence of information, wherein:
  each of said identification units comprises an identification opening having an identification plate disposed therein, and
  positions of the identification plates are detected by said probing portion to indicate features used by said detection unit to identify the type of the information recording medium.

54. An apparatus to identify a type of information recording medium, comprising:

a probing portion;

a case having sides defining an opening to accommodate the information recording medium therein, and an opening/closing member which opens and closes an opening through which the information recording medium is accessed, with a top one of the sides extending at least partially across the information recording medium;

identification units disposed on at least the top side of said case to be sequentially detected by said probing portion to produce a sequence of information; and a detection unit to determine the type of the information recording medium using the produced sequence of information, wherein:
  the sequence of the information is produced by said identification units moving past said probing portion such that elements of the sequence of information are sequentially detected, and
  the top side is disposed above or below a recording surface of the information recording medium.

55. An apparatus to identify a type of information recording medium, comprising:

a probing portion;

a case to accommodate the information recording medium;

identification units disposed on said case to be sequentially detected by said probing portion to produce a predetermined sequence of information; and a detection unit to determine the type of the information recording medium using the predetermined sequence of information, wherein:
  the sequence of the information is produced by a relative motion between said identification units and said probing portion,
  said case further comprises a top side disposed above or below a recording surface of the information recording medium, and a second side disposed adjacent the top side, and
  said identification units are disposed on the second side.

56. The apparatus of claim 49, wherein said probing portion comprises a probing sensor and a probing tip, where the probing tip detects states of each of said identification units and the probing sensor provides the detected states to said detection unit.

57. An apparatus to identify a type of information recording medium, comprising:
- a probing portion;
- a case to accommodate the information recording medium;
- identification units disposed on said case to be sequentially detected by said probing portion to produce a predetermined sequence of information; and
- a detection unit to determine the type of the information recording medium using the predetermined sequence of information, wherein:
- the probing portion comprises a probing sensor and a probing tip, where the probing tip detects states of each of said identification units and the probing sensor provides the detected states to said detection unit,
- the probing sensor detects a first state if the probing tip contacts an identification plate of said identification unit, and
- the probing sensor detects a second state if the probing tip detects an identification opening of said identification unit and does not contact the identification plate of said identification unit.

* * * * *